Feb. 28, 1961   P. A. PAINCHAUD   2,972,929
AUTOMATIC RECORDING PHOTOMETER
Filed Nov. 18, 1952   3 Sheets-Sheet 1
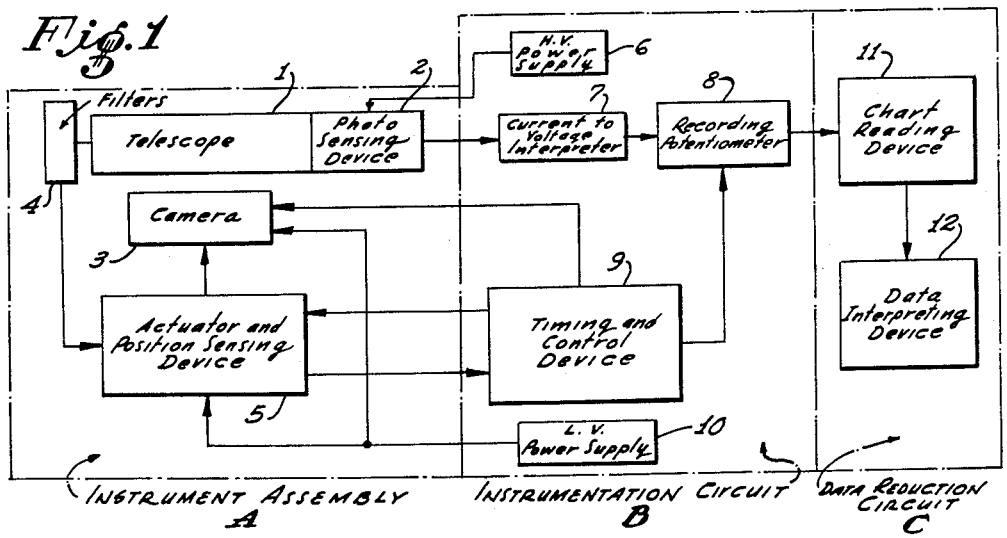
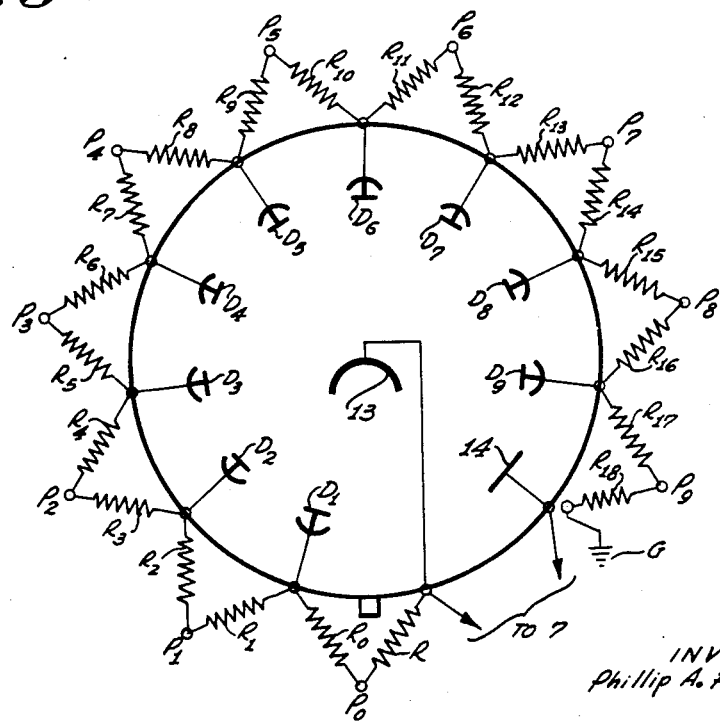
INVENTOR:
Phillip A. Painchaud
By Herbert E. Metcalf
His Patent Attorney Feb. 28, 1961 P. A. PAINCHAUD 2,972,929
AUTOMATIC RECORDING PHOTOMETER Filed Nov. 18, 1952 3 Sheets-Sheet 2

INVENTOR:
Phillip A. Painchaud

By Hubert E. Metcalf
His Patent Attorney

Feb. 28, 1961   P. A. PAINCHAUD   2,972,929
AUTOMATIC RECORDING PHOTOMETER
Filed Nov. 18, 1952   3 Sheets-Sheet 3
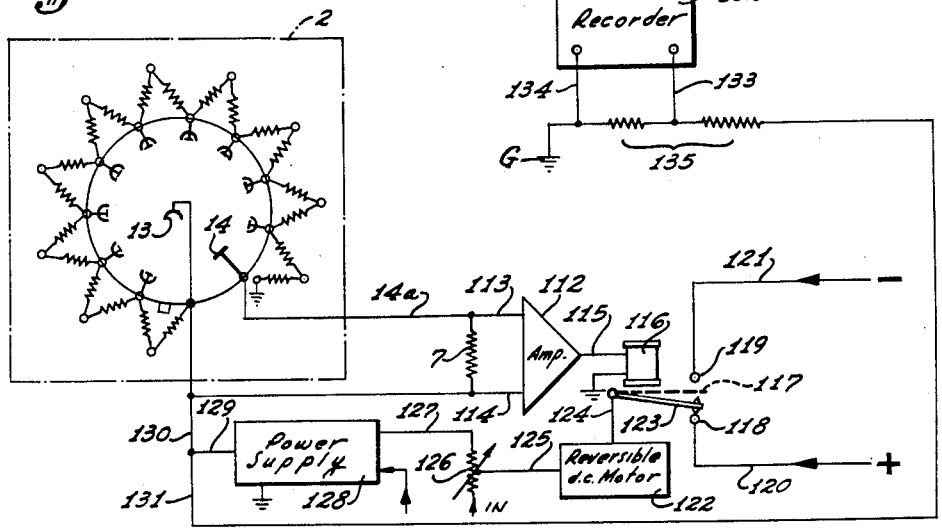
Fig. 4
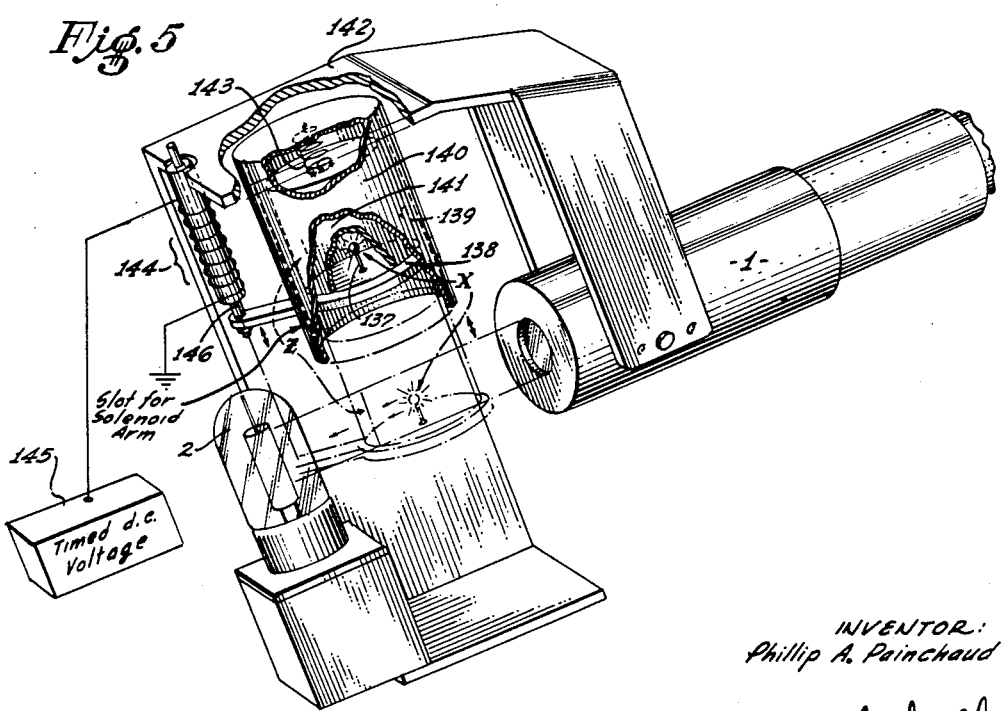
Fig. 5
INVENTOR:
Phillip A. Painchaud
His Patent Attorney United States Patent Office
2,972,929
Patented Feb. 28, 1961

2,972,929
AUTOMATIC RECORDING PHOTOMETER

Phillip A. Painchaud, San Gabriel, Calif., assignor to Northrop Corporation, Hawthorne, Calif., a corporation of California Filed Nov. 18, 1952, Ser. No. 321,177

7 Claims. (Cl. 88—23)

This invention relates to photometers and, more particularly, to an automatic recording photometer for measuring daytime sky brightness.

In order to determine the signal-to-noise ratio of the daytime sky with and without a star in the field of a tracking telescope and to arrive at an approximate discrimination level between a field of the daytime sky alone and the field with sky plus a star therein, daytime sky brightness data is desired for stellar navigation purposes, which heretofore has not been available. The present invention concerns an automatic photometer for obtaining the required sky brightness data.

The invention uses a telescope equipped with a photo-sensitive device; the response of this photo-sensitive device is charted by a recording potentiometer.

A telescope actuator and position sensing device, controllable filters and a color camera, are provided, so that measurements and photographs of the sky brightness at various times and directions can be made in accordance with any desired sequence control system.

Data is recorded, for example, by a strip-chart, single-pen recording potentiometer. Results can be read out in digital form by the addition of an analog-to-digital converter. The color pictures are used to reduce ambiguity of the data; furthermore they serve as an additional check to that which may be made by comparing the responses recorded while filters were in the light path of the telescope.

It is, accordingly, an object of this invention to provide a daytime sky brightness photometer which will accurately record a measure of the D.C. output of a phototube.

Experimentation has revealed that it is not uncommon for certain phototubes to change characteristics by as great an amount as 90% in a six month period. Tests confirm that maintenance of as small a plate current as possible drastically diminishes tube fatigue. For example, in the case of one type of phototube, maintenance of a plate current of $10^{-9}$ amperes greatly minimized fatigue. It appears generally that the lower the value of this plate current, the less the resulting tube fatigue.

Another object is to provide a recording photometer in which photoelectric current is maintained substantially constant and signals from a corrective control means are recorded as representative of brightness values.

A further object is to provide a photometer having a much greater inherent usable range of operation than the conventional phototube circuits, i.e., capable of accurately measuring light intensities between brighter and darker limits without damage to the photo-sensitive device.

A preferred embodiment of the invention comprises means for substantially reducing tube fatigue and consequently maintaining accurate instrument calibration over a long period of time. Briefly, the plate output of a phototube is conveyed to an amplifier, wired across a suitable load resistor. The output from this amplifier is conveyed to means for controlling a variable voltage device; this device controls input voltage to a power supply connected to the dynodes of the photomultiplier tube so as to maintain a desired substantially constant, small, plate operating current over the entire range of existing daytime sky brightness; corrective output from this power supply is conveyed to a recording device so as to record changes in light intensity.

Additional objects of this invention are:

To provide a recording photometer which is stable within 1 percent in long term accuracy and under repeated operations.

To provide a recording photometer which maintains calibration over a relatively long period of time.

Establishing a reference level, i.e., a fiducial recording on a graph, for example, is a difficult problem when it must be done by effecting an independent electrical actuation of a standardization circuit within a recording potentiometer to reset it and record a reference marker. A device herein disclosed provides a direct standardization reading via photo-sensing device 2 (Figure 1). This device is herein referred to as a "radioactive reference" because it is based upon the scientific observation that the rate at which a particular radio active material disintegrates is a constant, independent of all physical and chemical conditions. Mathematically speaking, it can be stated that given a large number of atoms of any one radioactive element, the number, $dN$, that will disintegrate in a small time interval, $dt$, is found to be proportional to the number of atoms, N, present at time $t$; that is $$-dN = \lambda N dt$$

where $\lambda$ is a constant for the particular radioactive element. Integration of the foregoing equation yields $$N = N_0 e^{-\lambda t}$$

where $N_0$ represents the number of atoms present at time $t=0$. This equation reveals that the number of atoms of a given radioactive substance decreases exponentially with time, providing no new atoms are introduced. Half of the material will have disintegrated at the end of a certain time interval T which can be determined by setting $N = N_0/2$ and $t = T$ yielding:

$$\lambda T = \log_e 2$$

$$T = \frac{0.693}{\lambda}$$

T is called the half-life period of the element. If T is known from experimental data, then the average lifetime $2/\lambda$ can be computed.

Among radioactive sources, half-life periods and hence average lifetimes vary considerably. For example, thorium C′ has the shortest half-life, $3 \times 10^{-7}$ seconds, while thorium has one of the longest, $1.39 \times 10^{10}$ years. A radioactive substance with a relatively long half-life provides an excellent source of relatively constant radiation, radioactive strontium, for example. This substantially constant and calculable radiation is then used to excite a phosphor, the light of which is presented to a photo-sensing device.

Another object of my invention is to provide a recording photometer in which fluorescence initiated by a radioactive substance is employed in order to establish a reference light level.

In order to provide further comprehension of the invention and of the objects and advantages thereof, reference will now be made to the following description and accompanying drawings, and to the appended claims in which various novel features of the invention are more particularly set forth.

In the drawings:

Figure 1 is a block diagram illustrating an automatic recording photometer system.

Figure 3 is a detailed schematic diagram of an associated photo-sensing device.

Figure 4 is a block diagram illustrating an embodiment of a recording photometer in which the photomultiplier plate current is maintained at a nearly constant value in order to minimize tube fatigue.

Figure 5 is a perspective diagram of an optical system of a photometer instrument assembly in which a radioactive substance is employed in order to establish a reference voltage level.

Figure 2:
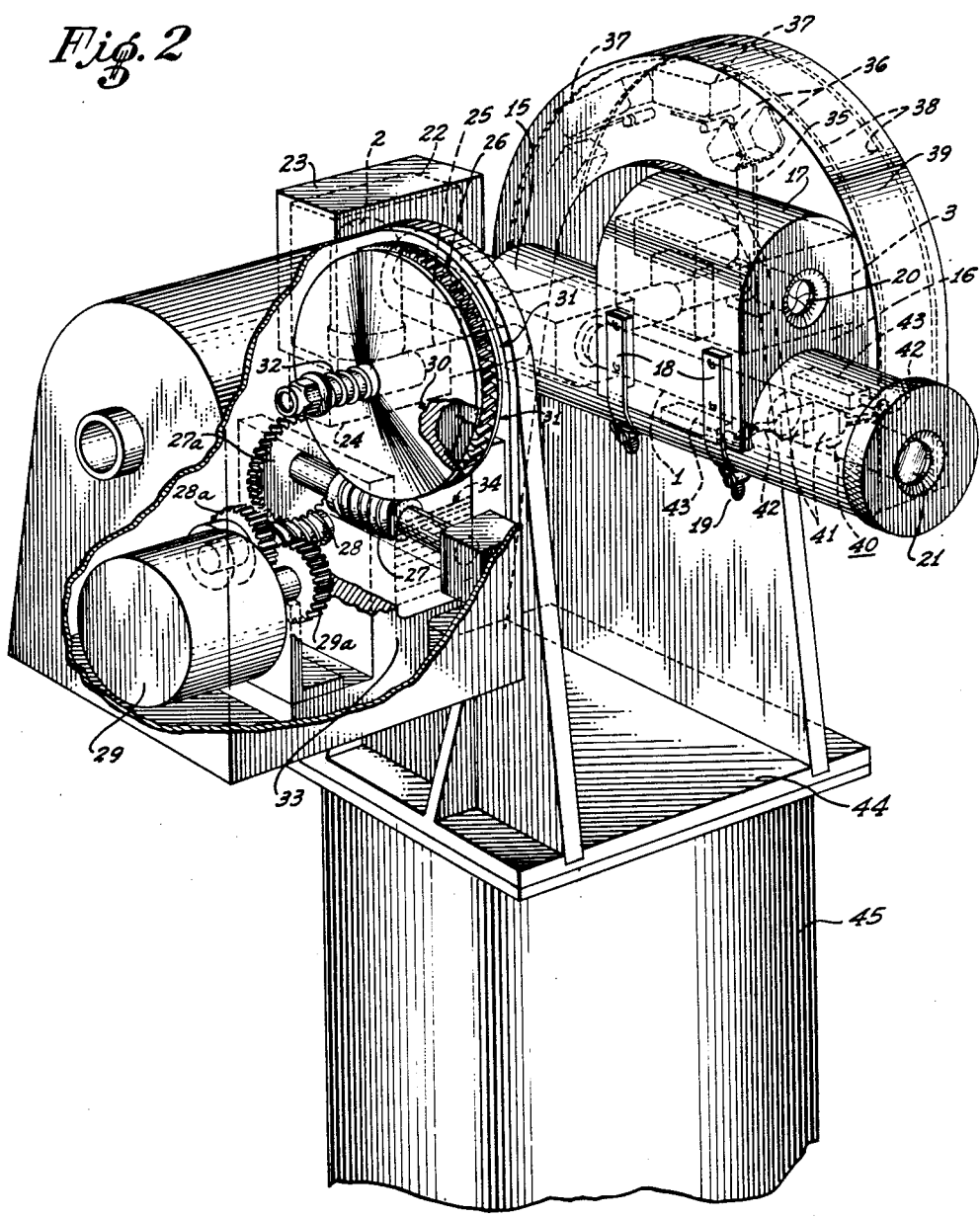
Figure 2 is a detailed phantom-perspective drawing of the instrument assembly.

Figure 1 is, for convenience of explanation, sub-divided into three sections: instrument assembly A, instrumentation circuit B and data reduction circuit C. Included in instrument assembly A are the following components: telescope 1, photo sensing device 2, color camera 3, filters 4 and actuator and position sensing device 5. Components in instrumentation circuit B are high voltage power supply 6, current-to-voltage interpreter 7, recording potentiometer 8, timing and control device 9 and low voltage power supply 10. Data-reduction circuit C includes chart-reading device 11 and data-interpreting device 12.

Telescope 1 is suitably mounted so as to be driven to any one of several predetermined positions; photosensing device 2 serves as a sensing device for telescope 1, i.e. converts light collected by telescope 1 into an electric current which has a magnitude proportional to the total energy of light striking the cathode of photo-sensing device 2. The resulting electric current routed via current-to-voltage interpreter 7 is used to actuate recording potentiometer 8 which provides a record of anode current in timed sequence on a chart. It is from such charts that differentiation can be made of various sequences of observation. Recording potentiometer 8 comprises an analog device which provides a graphic record of changes in sky brightness (a continuous balance electronic recording potentiometer, for example). Such instruments are conventional and their connection to an input signal voltage across interpreter 7 is obvious. Output from recording potentiometer 8 is conveyed to chart reading device 11 which may be used to convert graphic analog information into rectangular coordinate digital form, add proper constants for zero-drift correction, time position, sequence and filter information. Information read from chart reading device 11 may be transferred as punches on cards, for example. Information is next conveyed to data interpreting device 12 which sorts and classifies cards, selects the cards to be used, and tabulates the data in useable form. Information thus prepared can ultimately be conveyed to a plotting device (not shown) which will graph information in combinations as may be necessary for proper data evaluation. Automatic camera 3 is used to photograph the sector of the sky which is included in the field of the telescope. Timing and control device 9 can provide a programmed sequence of signals to energize telescope actuator and position sensing device 5 according to a predetermined program, to transmit signals which result in the insertion and removal of filters 4 into the optical path, to actuate the shutter of automatic camera 3, and to select the time for standardization of recording potentiometer 8 and the photo-sensing device.

Stability of the system is insured by a regulated high-voltage power supply 6 whose output is conveyed to photo-sensing device 2. For example, a nominal 1000±20 volts is maintained at a stability of ±½ volt. Power supply 10 is used to supply low voltage (24 volts D.C., for example) to timing and control device 9, to actuator and position sensing device 5, and to camera 3.

Figure 2 comprises a perspective cut-away drawing of one embodiment of the instrument assembly which was represented by block A in Figure 1. Telescope 1 is shown with photo-sensing device 2 (a photomultiplier tube) mounted aft of the telescope. Photomultiplier tube 2 is of extremely high sensitivity (Radio Corporation of America, type 1P21, for example).

Reference is temporarily made to Figure 3 where a schematic diagram of a photomultiplier tube is presented. The number of electrons released from cathode 13 is proportional to the number of incident photons (amount of light received) from telescope 1. Secondary emission multiplying or deflecting anode or dynodes, as they are sometimes called, $D_1$, $D_2$, $D_3$, $D_4$, $D_5$, $D_6$, $D_7$, $D_8$ and $D_9$ are connected by means of resistors $R_1$ through $R_{17}$ to successively higher potential points $P_1$ through $P_9$. Cathode 13, connected to dynode $D_1$ via resistor R, potential point Po, and resistor Ro, upon bombardment by photons, emits electrons which strike first anode $D_1$, consequently liberating secondary electrons which in turn, are directed to anode $D_2$. These electrons in turn, generate more secondary electrons from anode $D_2$ and so on to anode $D_9$. Velocities of electrons leaving anode $D_9$ are in accordance with a Maxwellian distribution, i.e., a distribution such that the number of electrons at a given velocity is proportional to the reciprocal of the exponential of the square of the velocity. A portion of these electrons possess sufficient velocity to reach final or collector anode 14; resulting current from these electrons passes through current-to-voltage interpreter 7 (Figure 1) and from thence to recording potentiometer 8.

Referring again to Figure 2, note that telescope 1 is enclosed by housing 15 upon which mount 16 supports camera 3 which is enclosed by camera housing 17. The camera used in a preferred embodiment is a 16 mm. gun camera modified to take a single exposure upon receipt of a signal impulse. A portion of the tubing was cut away so that it may be opened from the rear, providing film accessibility. Camera housing 17 comprises welded aluminum sealed with sponge rubber; it is clamped to telescope housing 15 with straps 18 and wing nuts 19. A viewing window 20 is provided for the camera just as a telescope viewing window 21 is provided in telescope housing 15.

Sealed phototube housing 22 is enclosed by an additional cover 23 which is painted with a highly reflective coating. An air gap between phototube housing 22 and additional cover 23 aids in the prevention of solar heating of photomultiplier tube 2.

Junction box 24, used for connections of lead-in wires and other electronic components, is attached to phototube housing 22.

The components described in the next three paragraphs are included in the actuator and position sensing device 5 as shown in the system of Figure 1.

Shaft assembly 25 serves as a pivot for telescope housing 15 and for camera housing 17. Worm gear 26 is freely rotatable on one end of shaft assembly 25. Worm gear 26 is driven by worm 27 which is in turn, driven by gear 27a, worm 28, and gear 28a via gear 29a turned by the shaft of drive-motor 29—a shunt-wound, 24 volt, reversible D.-C. motor of 1/20 H.P. and 1725 r.p.m., for example.

A friction clutch comprising first clutch face 30 and second clutch face 31 is spring-loaded (via spring 32), keyed and locked to shaft 25. Clutch facing material is a special virgin cork, for example. The double clutch is thus worm gear driven via worm gear 26 which rides freely on shaft 25 in order to permit telescope 1 to be swung manually in any direction without damage to worm gear 26 or to its bearings. The complete drive mechanism is placed in oil sump 33 and is completely immersed in oil 34—Dow-Corning silicone oil of 200 centistokes viscosity, for example.

To the other end of shaft assembly 25 is rigidly attached arm 35, supporting double cam 36. Snap-action switches 37—microswitches, for example, are mounted, at predetermined intervals on top semi-circular plates 38, in parallel, riding in slots for adjustment. Snap-action switches 37 are actuated by double cam 36. A weather proof welded aluminum cover 39 encloses the limit switch assembly.

The purpose of this telescope actuator and position sensing device 5 is to set telescope 1 into motion via drive motor 29 and to stop movement of telescope 1 when an appropriate positioning snap action switch 37 has been opened; this switch indicates that telescope 1 is in proper position. It will remain in this position until timing and control device 9 (which can operate a multiple-position stepping selector switch, for example) effects re-energization of motor 29. It will be understood that timing and control device 9 will be designed to include the required means for performing any desired sequence of energization of actuator and position sensing device 5 (including motor 29, switches 37, and cam 36), and camera 3, as mentioned before, and of filter mechanism 40 and radioactive reference solenoid 144, to be described hereinafter.

Filter mechanism 40, comprising two filters 41, two bell cranks 42 and two linear solenoids 43, is located just ahead of telescope 1 in telescope housing 15. Operation of either filter solenoid introduces its respective filter 41 (either a red or blue optical glass) into the light path in front of the telescope lens.

Telescope 1 used in a preferred embodiment of the invention has a one-inch objective lens with a ten-inch focal length which is reduced to a ratio of $f/100$ through the use of a 0.1 inch aperture and an 0.02 inch field stop. The measured field of observation is 1°0'6" of arc.

The entire instrument assembly is completely enclosed and sealed against the weather, being mounted on base 44 which is supported by pedestal 45, the purpose of which is to keep the instrument assembly above the snow line in the winter time, during periods of unattended operation. Desiccating packets are used within housings 15 and 17 in order to control humidity. Thus the instrument can be operated on a 24 hour schedule and it need not be attended except for weekly loading and removal of recording charts and camera films, monthly changing of desiccator packets and occasional cleaning of the observation windows.

Current-to-voltage interpreter 7 (Figure 1) includes a fixed precision resistor, 1000 ohms, for example, inserted in series with the anode-cathode circuit of photo-sensing device 2; the voltage drop across interpreter 7 is measured and recorded by recording potentiometer 8. Such an arrangement does not have the effect of a load upon the circuit; furthermore it has negligible back E.M.F. effects. For example, with the 1P21 photomultiplier tube, maximum current is approximately 10 microamperes which results in a maximum voltage drop of 10 millivolts. Although the simple circuit mentioned in this paragraph may be suitable for use over a relatively narrow range of light values, the improved circuit described in the following paragraphs is preferred.

In Figure 4, there is presented, in a combination block-schematic diagram, a preferred embodiment of the photometer signal circuit; in this embodiment, an average current of a desired optimum operating value-$10^{-9}$ amperes, for example, is maintained on final anode 14 of photosensing device 2. Utilization of an optimum value for average anode current serves to reduce tube fatigue and consequently to maintain accurate instrument calibration over a long period of time.

Final anode 14 of photosensing device (a RCA type 1P21 photomultiplier tube, for example) is connected to cathode 13 via lead 14a and current-to-voltage interpreter (load resistor) 7. A D.C. amplifier 112 is connected across current to voltage interpreter 7 via leads 113 and 114. Output from amplifier 112 is connected to sensitive D'Arsonval type polarized relay 116 by means of lead 115. Neutral position 117 of sensitive relay 116 is maintained as long as the proper average current $10^{-9}$ amperes, for example, is maintained in anode 14. Relay contacts 118 and 119 are connected to positive and to negative D.C. sources, via leads 120 and 121, respectively. Reversible D.C. motor 122 is of the shunt wound type and is connected to relay switch 123 via lead 124. Shaft 125 of reversible D.C. motor 122 is mechanically connected to variable voltage device 126 which regulates input voltage to a power supply 128 via lead 127. Output lead 129 from power supply 128 is connected, via lead 130, to cathode 13 of photosensing device 2 and is also connected, via lead 131 to voltage divider 135 and ultimately to ground G. Recorder 132 (which is equivalent to recording potentiometer 8) is connected across voltage divider 135 by means of leads 133 and 134.

Current from final anode 14 varies in accordance with light intensity (number of incident photons) impinging upon photo-sensing device 2. The effect of such variations is to deflect relay switch 123 to either contact 118 or to contact 119, depending upon the relative strength and direction of such variations.

Reversible D.C. motor 122 is rotated in a direction in accordance with the polarity of a D.C. operating voltage received on lead 124. Rotation of motor shaft 125 mechanically varies the voltage of variable voltage device 126 in accordance with voltage fluctuations appearing on final anode 14. A varying voltage output from power supply 128 is conveyed to cathode 13 via lead 130 and is also conveyed to recorder 132 via lead 131; the voltage appearing on cathode 13 is thus of a corrective nature effecting a current on final anode 14 with a statistical average approximating a desired optimum operating value—$10^{-9}$ amperes, for example.

Theoretically, the device as disclosed in Figure 4 will extend the operating range of a given phototube circuit to infinity. Practically, however, a range of measurable brightness levels of about ten times that of a direct signal recording system can be achieved easily. Of course, the position of this operating range can be set, by other means, to cover any possible high or low brightness level.

Figure 5 is a combined cutaway perspective-schematic diagram illustrating a radioactive reference device, comprising radioactive source $x$ supported by rod 137 which is mounted at the center of lead base 138 of hollow metal cylinder 139 having a phosphor screen Z in the side thereof adjacent the photo-sensing device 2. Cylindrical lead housing 140 rigidly attached to mounting bracket 142, includes hollow chamber 141 into which cylinder 139 is telescoped owing to tension of spring 143. Linear solenoid 144 is alternately energized, then de-energized, at predetermined time intervals, by signals from timed D.C. voltage source 145 which can be any suitable switch controlled manually or automatically as desired. When linear solenoid 144 is energized, arm 146 is extended and radioactive source $x$ and phosphor screen Z along with cylinder 139 are positioned within the optical path of photosensing device 2 (as indicated by dotted lines) blocking the sky light and presenting phosphor light only thereto; when linear solenoid 144 is de-energized, cylinder 139 fits snugly within hollow chamber 141 of cylindrical lead cover 140. Time intervals can be arranged so that radioactive source $x$ is held in the optical path of photosensing device 2 upon commencement of and also upon completion of an observational sequence.

It is to be noted that photosensing device 2 is excited by photon emission from thin phosphor screen Z; this photon emission arises from the bombardment of active particles from radioactive source $x$. Thus thin phosphor screen Z acts as a "middle-man," so to speak i.e., converts radiation energy from radioactive source $x$ to energy within the visible light spectrum; this light energy is ultimately converted to electrical energy by photosensing device 2, as previously explained.

The embodiment shown in Figure 5 is obviously adaptable as a modification of the optical system shown in the instrument assembly of Figure 2. No particular operative connections between the solenoid 144 and the control system for the instrument positioning assembly are included herein, since such limitations are not necessary or desirable for the invention as claimed. Many variations in the arrangement of the system or in the circuits and mechanical assembly described, without departing from the spirit and scope of the invention, may be apparent to those skilled in the art. Therefore the invention is claimed in any of its forms or modifications within the legitimate and valid scope of the appended claims:

What is claimed is:

1. In an automatic recording photometer, a photo-sensing device, an optical system positioned to direct light from the sky into said photo-sensing device, means for measuring and recording the output of said photo-sensing device, and means for selectively exposing said photo-sensing device to a light source of substantially constant intensity only, said latter means comprising movable container means including a screen portion of light transmitting material, a layer of phosphor on said material, a radioactive substance having a relatively long half life positioned to energize the phosphor on said screen, and means operable to move said container, screen, and radioactive substance into and out of the optical path between said optical system and said photo-sensing device with said phosphor in position to energize said photo-sensing device and said container in position to block all other light from said device.

2. Apparatus in accordance with claim 1 in which said photo-sensing device is a photomultiplier tube.

3. Apparatus in accordance with claim 1 in which said radioactive substance is a strontium isotope.

4. In a recording photometer, means for maintaining photo-electric current substantially constant over a relatively large range and long period of time, comprising: a photo-sensing device including an anode and a cathode, a current-to-voltage interpreter connected between said anode and said cathode, an amplifier having its input connected across said interpreter, a sensitive polarized relay connected to the output of said amplifier, said polarized relay having a center balanced pole element and two opposite position contacts therefor, a reversible electric motor with an operating input connected to said pole element, opposite-direction motor energizing means connected respectively to said two position contacts, a variable D.C. voltage source with its output operatively connected to said photo-sensing device, mechanical means connected between the output shaft of said motor and said variable D.C. voltage source to adjust the output voltage of the latter when said motor is energized, the polarity of the various recited connections being in the proper sense to decrease the supply voltage to said photo-sensing device when the output current thereof tends to increase, and vice versa, a recording device, and voltage transmission means connected between the output of said variable D.C. voltage source and the input of said recording device, whereby the variable voltage from the adjusted D.C. voltage supply provides a measure of brightness input to said photo-sensing device.

5. Apparatus in accordance with claim 4 wherein said voltage transmission means comprises a step-down voltage divider.

6. Apparatus in accordance with claim 4 in which said photo-sensing device is a photomultiplier tube.

7. Apparatus in accordance with claim 4 in which said current-to-voltage interpreter is a resistor.

References Cited in the file of this patent

UNITED STATES PATENTS

| | | |
|---|---|---|
| 2,059,032 | Riszdorfer | Oct. 27, 1936 |
| 2,287,322 | Nelson | June 23, 1942 |
| 2,413,080 | Seeley | Dec. 24, 1946 |
| 2,566,277 | Williams et al. | Aug. 28, 1951 |
| 2,577,815 | Saunderson | Dec. 11, 1951 |
| 2,647,436 | Shapiro | Aug. 4, 1953 |